United States Patent [19]

Schubert et al.

[11] 4,312,096
[45] Jan. 26, 1982

[54] CASTER ASSEMBLY

[75] Inventors: Dale W. Schubert, Sudbury; Henry E. Hines, Norwood, both of Mass.

[73] Assignee: Barry Wright Corporation, Watertown, Mass.

[21] Appl. No.: 73,277

[22] Filed: Sep. 7, 1979

[51] Int. Cl.³ .................. A47B 91/00; B60G 11/34
[52] U.S. Cl. ........................... 16/44; 267/21 R
[58] Field of Search ............ 16/44; 267/21 R, 21 A, 267/57.1 A

[56] References Cited

U.S. PATENT DOCUMENTS

| 2,066,187 | 12/1936 | Piron | 16/44 |
| 2,581,912 | 1/1952 | Brown | 16/44 |
| 3,041,656 | 7/1962 | Goodall | 16/44 |

FOREIGN PATENT DOCUMENTS 793615 11/1936 France ............... 267/57.1 A
629434 9/1949 United Kingdom .

Primary Examiner—Doris L. Troutman
Attorney, Agent, or Firm—Milton E. Gilbert; Gary E. Ross

[57] ABSTRACT

A caster assembly comprising an outer part for attachment of the assembly to a structure to be mobilized, said outer part having spaced parallel side walls, an inner part having spaced parallel side walls nested within the outer part with its side walls spaced from and parallel to the side walls of the outer part, wheel supporting legs to which a wheel is journaled, pins rotatably supporting the wheel supporting legs between the side walls of the inner and outer parts and elastically resilient members connecting the wheel supporting legs to the spaced parallel walls of the inner and outer parts in areas centered about the axes of the pins, said elastically resilient members being elastically deformable in torsion.

14 Claims, 5 Drawing Figures

CASTER ASSEMBLY

BACKGROUND OF THE INVENTION

Casters provided with elastic means disposed between the wheel support and the wheel to provide for shock and vibration isolation wherein an elastically resilient material such as an elastomer is used are shown in U.S. Pat. Nos. 3,178,758; 3,041,656; and 1,745,992. In U.S. Pat. No. 3,178,758, an elastomer bushing is mounted in the wheel hub and in conjunction with two linkages, provides vertical compliance for shock and vibration isolation. In U.S. Pat. No. 3,041,656, an elastomer bushing is mounted on the upper caster element and is loaded both radially and in torsion by an L-shaped leg to provide vertical compliance for shock and vibration isolation. In U.S. Pat. No. 1,745,992, an elastomeric compression pad is provided for shock and vibration isolation.

The present invention has in common with the aforesaid patents the use of an elastically resilient body for affording isolation of shock and vibration, but differing therefrom by taking advantage of the torsional resistance of the body to displacement rather than its compressive resistance to displacement. The proposed structure provides for replacing a number of parts with a single part, provides for low profile vibration and shock isolation, and affords a saving in space and weight ordinarily taken up by spring coils and the like.

SUMMARY OF THE INVENTION

As herein illustrated, the caster assembly comprises a rigid mounting for attachment of the assembly to the structure to be mobilized or to a swivel which, in turn, is attached to the structure to be mobilized, wheel supporting means, wheels rotatably mounting the wheel supporting means to the rigid mounting, a wheel rotatably journaled to said wheel supporting means for rotation about an axis spaced from and parallel to the axis of rotation of the wheel supporting means and elastically resilient means connecting the wheel supporting means to the rigid mounting, said elastically resilient means being elastically deformable in torsion. The rigid mounting comprises in one form a first rigid part for attachment to the structure to be mobilized, said first rigid part having spaced, parallel side walls containing aligned openings and a second rigid part having spaced, parallel side walls containing aligned openings nested within the first part with its side walls spaced from and parallel to the side walls of the first part and with the holes therein aligned with the holes in the first part. The wheel supporting means comprise wheel supporting legs disposed between the spaced, parallel walls of the first and second parts and the means rotatably mounting the wheel supporting legs to the side walls of the first and second parts comprise pins. The elastically resilient means are elastomer disks comprised of natural or synthetic rubber disposed between the legs and the side walls of the respect inner and outer parts and bonded thereto throughout circular areas centered with respect to the axes of the pins. Alternatively, the mounting may comprise only the first part. When thus constructed, the wheel supporting legs are pivotally connected to the inner sides of the spaced, parallel walls in spaced relation thereto by pins and the elastomer disks are disposed between the legs and the inner sides of the walls.

The invention will now be described in greater detail with reference to the accompanying drawings, wherein.

Figure 1:
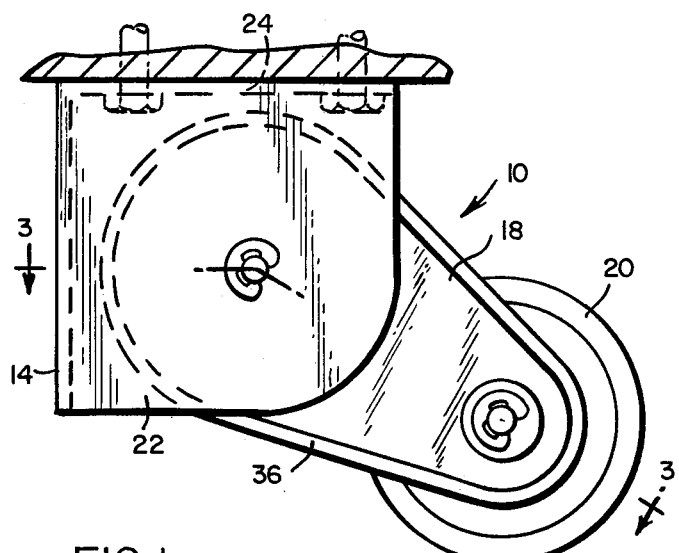
FIG. 1 is a side elevation of the caster assembly.
Figure 2:
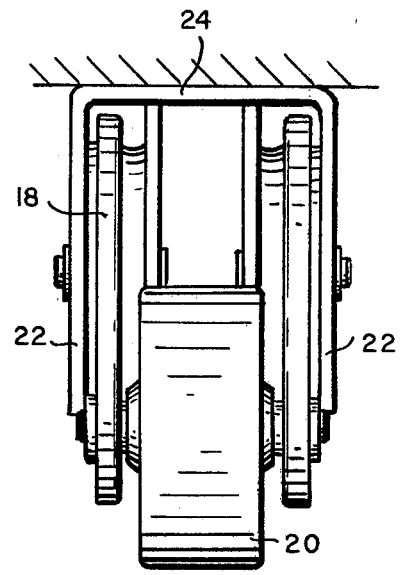
FIG. 2 is a front elevation of the caster assembly.
Figure 3:
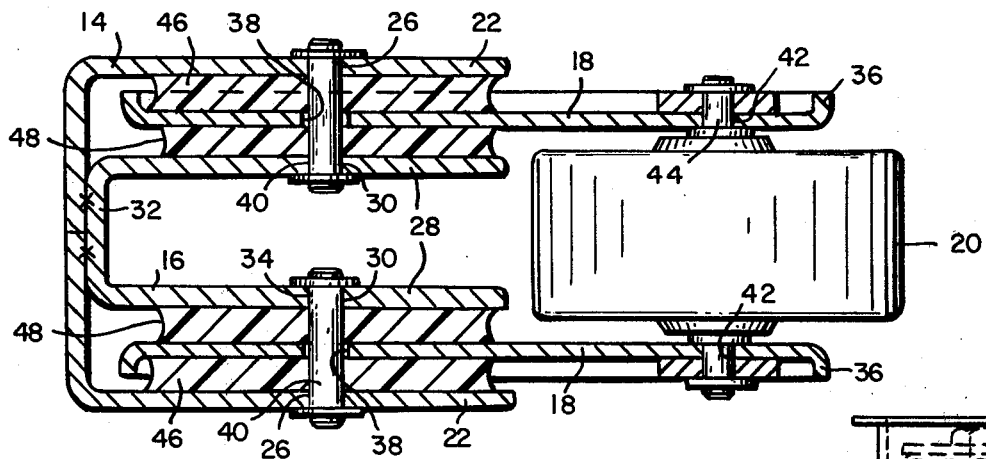
FIG. 3 is a section taken on the line 3—3 of FIG. 1.
Figure 5:
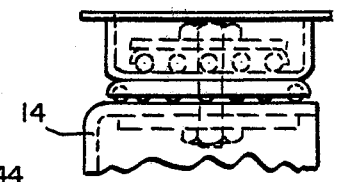
FIG. 5 is a fragmentary elevation of a swivel mounting for the assembly.

Referring to the drawings, the assembly 10 comprises an outer part 14 adapted to be fastened by bolts or swivel means to a structure to be mobilized, an inner part 16 fixed to the outer part, wheel supporting legs 18—18 and a caster wheel 20. FIGS. 1 and 2 show the part 14 bolted to the structure to be mobilized and FIG. 5 shows the part swivelly connected to the part to be mobilized.

The outer part 14 has spaced, parallel side walls 22—22 containing aligned openings 26—26.

The inner part 16 also has spaced, parallel side walls 28—28 containing aligned openings 30—30 and is nested within the outer part and welded thereto with the side walls 28—28 spaced from and parallel to the side walls 22—22 and with the openings 30—30 aligned with the openings 26—26.

The wheel supporting legs 18—18 have generally circular ends, FIG. 1, of larger diameter at one end than the other and have peripherally thereof right angularly disposed outwardly facing peripheral flanges 36—36 which provide for stiffening the legs. Each of the wheel supporting legs is provided with a hole 38 for receiving a pin 40 inserted through the holes 26 and 30 in the legs 22 and 28 for pivotally supporting the wheel supporting legs at their larger diameter ends between the legs 22 and 28. The other or distal ends of the wheel supporting legs 18—18 are provided with holes 42—42 for receiving a pin 44 upon which is rotatably mounted the wheel 20.

In accordance with this invention, the larger or proximal ends of the legs 18—18 are connected to the side walls 22 and 28 of the outer and inner parts by disks of elastically deformable material 46—46 and 48—48. The disks 46-46 are bonded to the outer side of the wheel legs 18 and to the inner sides of the side walls 22—22 and the disks 48 are bonded to the inner sides of the wheel legs 18 and to the outer sides of the side walls 28—28. These disks correspond substantially in diameter to the diameter of the larger ends of the wheel legs and are displaceable in torsion, thus permitting the wheel legs to yield by torsion of the disks in contrast to compression which is characteristic of casters of the prior art.

Figure 4:
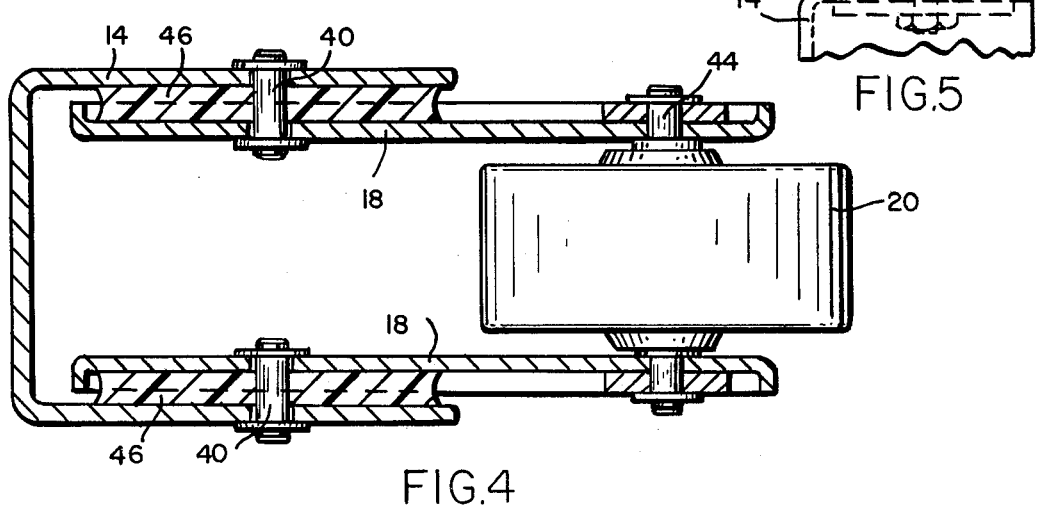
FIG. 4 is a section of an alternate structure wherein the inner part is omitted.

As described thus far, the mounting comprises outer and inner parts. However, it is within the scope of the invention to omit the inner part and mount the wheel supporting legs between the side walls of the outer part as shown in FIG. 4 with elastomer disks connecting the wheel supporting legs to the side walls of the outer part.

As thus constructed, when the wheel 20 is forced upwardly, a torque and shear force are generated. In this design, the deflections resulting from shear loading are very small and will be negated. The torque causes the elastomer disks to be placed in a torsional mode of loading that results in a rotational deflection of the wheel legs. The rotational stiffness for one disk loaded in torsion is expressed as $$K_\theta = \frac{2\pi G D^4}{32 t}$$

where
G is the shear modulus of the elastomer
D is the outside diameter of the elastomer disk
t is the elastomer disk thickness
For two disks the total torsion stiffness $\overline{K}_\theta = 2 K_\theta$, and when four disks are used, the total torsional stiffness $\overline{K}_{74} = 4K_\theta$. The relationship of the caster axial stiffness K to the total rotational stiffness $\overline{K}_{74}$ is $$K = \frac{\overline{K}_\theta}{R^2 \cos^2 \psi}$$

where
R is the distance from the wheel caster to the disk center
$\psi$ is the angle from the horizontal plane to the leg axis. Once the axial stiffness K is established, the functioning of the caster as a shock or vibration isolator is obvious to those skilled in the art of shock and vibration isolation.

The term "elastomer" as used herein is intended to cover natural and synthetic rubbers, for example, such synthetic rubbers as silicone rubber, styrene butadiene rubber, copolymers of acrylonitrile and copolymers of methyl methacrylate and plastics exhibiting rubber-like characteristics.

It should be understood that the present disclosure is for the purpose of illustration only and includes all modifications or improvements which fall within the scope of the appended claims.

We claim:

1. A caster assembly comprising: a mounting having a top surface for attachment of the assembly to a structure to be mobilized and spaced parallel side walls extending perpendicular to said top surface; a pair, and not more, of legs extending parallel to and, at a first end, beyond said side walls away from said top surface; a wheel rotatably journaled on said first end of said legs and disposed therebetween; said mounting's side walls and the second end of said legs having spaced parallel confronting surfaces and aligned holes perpendicular thereto; means extending through said holes for pivotally mounting the second end of the legs to said side walls; and elastomeric disks having a first and second side disposed parallel to and between the confronting surfaces and bonded thereto along the entire extent of said first and second sides about said pivotally mounting means wherein said elastomeric disks are elastically deformable in torsion.

2. The caster assembly of claim 1 wherein the first and second sides of the elastomeric disks are of a generally planar circular configuration bonded directly to the confronting surfaces along circular areas equal in diameter to the diameter of the disks.

3. The caster assembly of claim 1 wherein the legs have about their periphery a stiffening flange, the top surface of the mounting is swively connected to the structure to be mobilized, and the pivotally mounting means includes a pair of pins, each pin pivotally mounting a leg to a side wall.

4. A caster assembly comprising a first rigid mounting for attachment of the assembly to a structure to be mobilized, wheel supporting means, a wheel rotatably journaled on the wheel supporting means, a second rigid mounting fixed to the first rigid mounting, said mountings each having spaced parallel surfaces, means pivotally mounting the wheel supporting means between said spaced parallel surfaces of said mountings and elastically resilient means connecting the wheel supporting means to the spaced parallel surfaces of the mountings.

5. A caster assembly according to claim 4 comprising pivot means pivotally connecting the wheel supporting means to the first and second mounting means for pivotal movement about an axis spaced from and parallel to the axis of rotation of the wheel and wherein the elastically resilient means are circular and are bonded to the circular areas of the confronting surfaces of the wheel supporting means and the first and second mountings about the axis of said pivot means.

6. A caster assembly according to claim 4 wherein pins pivotally connect the wheel supporting means to the first and second mountings and the elastically resilient means are circular disks of elastomer material bonded to circular areas of the confronting surfaces of the wheel supporting means and the first and second mounting means about the axes of the pins.

7. A caster assembly comprising a first rigid part having spaced parallel side walls containing openings, a second rigid part having spaced parallel side walls having openings fixed to the first part with its side walls spaced from and parallel to the side walls of the first part and with the holes therein aligned with the holes in the side walls of the first part, wheel supporting means having spaced parallel legs containing holes disposed between the side walls of the first and second parts with the holes therein aligned with the holes in the first and second parts, pins extending through the holes of the wheel supporting legs and the walls of the first and second side parts pivotally supporting the wheel supporting legs to the first and second parts and elastomer means disposed between the legs and the side walls of the first and second parts and bonded thereto, said elastomer means being elastically yieldable in torsion.

8. A caster assembly comprising a first part having spaced parallel side walls, a second part having spaced parallel side walls disposed within the first part with its side walls spaced from and parallel to the side walls of the first part, a pair of wheel legs disposed between the side walls of the first and second parts, said wheel legs containing bearings for rotatably receiving a wheel therebetween, means pivotally connecting the wheel legs to the side walls of the first and second parts for rotation about an axis spaced from and parallel to the axis of the wheel and elastomer means connecting the wheel legs to the side walls of the first and second parts.

9. A caster assembly comprising an outer part having spaced parallel side walls, an inner part having spaced parallel side walls, said side walls having aligned holes, wheel legs disposed between the side walls of outer and inner parts, said wheel legs containing openings aligned with the openings in the side walls, means disposed in the openings of the respective parts pivotally supporting the wheel legs to the parts, said wheel legs having at their distal ends bearings for rotatably receiving a wheel and elastomer means connecting each wheel leg, respectively, at one side to a side wall of the outer part and at the other side to a side wall of the inner part.

10. A caster assembly comprising an outer part having spaced, parallel side walls, an inner part having spaced, parallel side walls nested within the outer part with its side walls spaced from and parallel to the side walls of the outer part, said side walls containing aligned openings, a pair of wheel legs, means rotatably mounting the wheel legs at one end between the spaced, parallel side walls of the outer and inner parts, means rotatably journaling a wheel at the distal end of the wheel legs for rotation about an axis spaced from and parallel to the axis of the means pivotally mounting the legs to the inner and outer parts and torsion-resistant means yieldably connecting the proximal ends of the legs to the side walls of the outer and inner parts.

11. A caster assembly according to claim 10 wherein the means rotatably mounting the wheel legs to the side walls of the inner and outer parts are pins, and the elastically resilient means are circular disks of elastomer material bonded to the parallel surfaces of the wheel legs and the side walls of the inner and outer parts about the axes of the pins.

12. A caster assembly according to claim 10 wherein the torsion-resistant means are elastomer disks disposed between the parallel portions of the wheel legs and the legs of the inner and outer parts about the means rotatably mounting the wheel legs to the inner and outer parts and bonded thereto.

13. A caster assembly according to claim 10 wherein the means rotatably mounting the wheel legs are pins and the torsion-resistant means are elastomer disks disposed between the wheel legs and the side walls about the pins and bonded throughout their circular surfaces to the wheel legs and legs of the parts.

14. A caster assembly according to claim 8 wherein means pivotally connecting the wheel legs to the side walls of the parts are bolts and wherein the proximal ends of the wheel legs define relatively broad circular surfaces parallel to the side walls of the parts and the elastomer means are disks of elastomer disposed between the proximal ends of the legs and the side walls and bonded thereto throughout their circular areas.

* * * * *